UNITED STATES PATENT OFFICE.

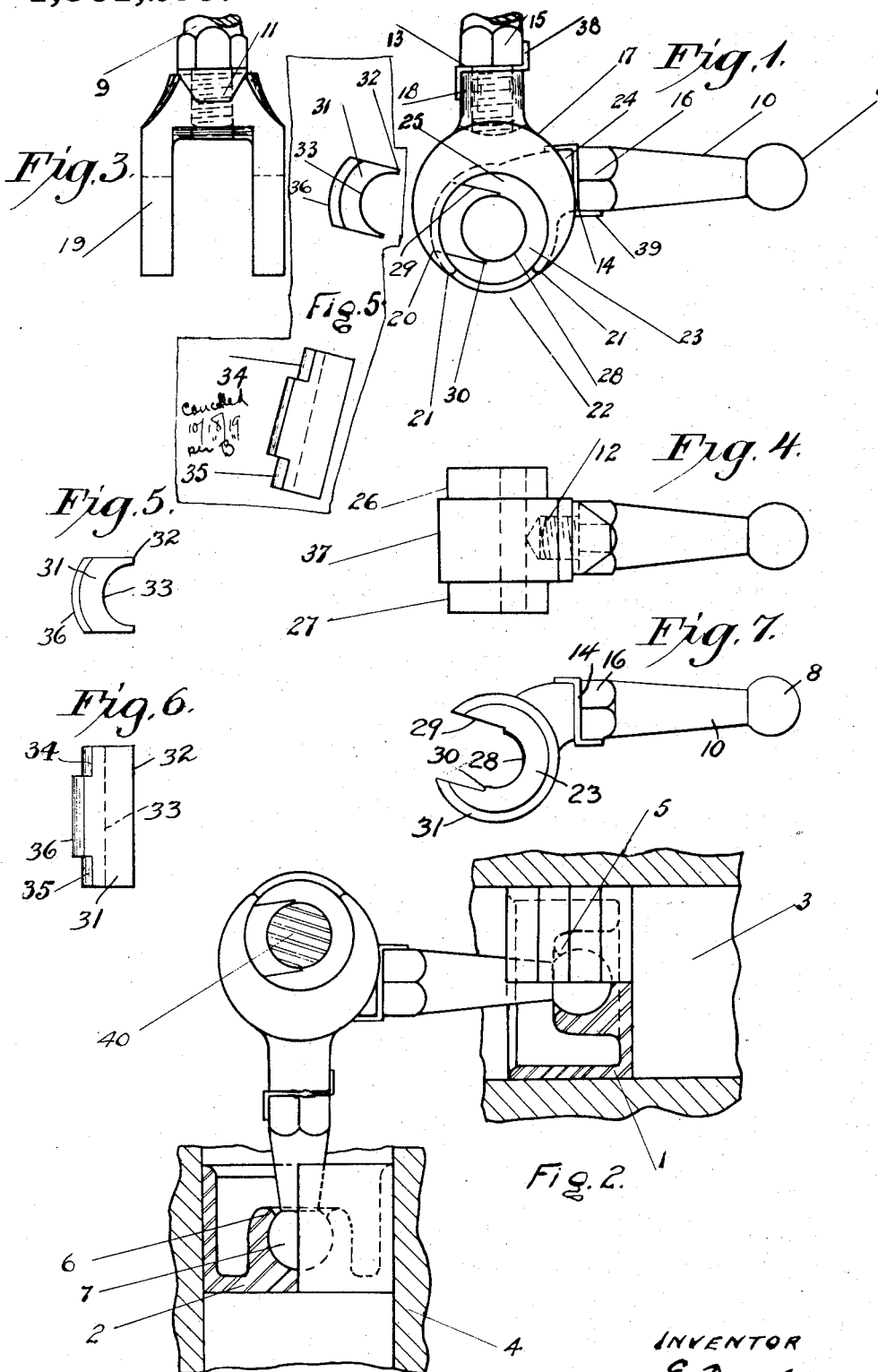

ERNEST DUCHESNE, OF MONTREAL, QUEBEC, CANADA.

PISTON-ROD TOGGLE MECHANISM.

1,361,235.　　　　Specification of Letters Patent.　　Patented Dec. 7, 1920.

Application filed March 3, 1919. Serial No. 280,449. Renewed September 2, 1920. Serial No. 407,823.

*To all whom it may concern:*

Be it known that I, ERNEST DUCHESNE, a subject of the King of Great Britain, and residing in the city and District of Montreal, in the Province of Quebec, in the Dominion of Canada, have invented a new and useful Piston-Rod Toggle Mechanism, of which the following is the specification.

The invention relates to piston rod toggle mechanism as described in the present specification and illustrated in the accompanying drawings that form part of the same.

The invention consists essentially in the novel means employed for fastening the toggle members to the crank of the crank shaft.

The objects of the invention in the first place are to effect economy in large works where numerous machines are in operation which include a toggle-joint connection to the crank shaft from the piston; in the next place to increase the outputs of factories by eliminating the break-downs of machines employing this toggle-joint; and generally to provide a simple and efficient device which may be both serviceable and durable for many uses.

In the drawings, Figure 1 is a side elevation of the joint mechanism removed from the pistons of a pneumatic tool.

Fig. 2 is a longitudinal sectional view of a cylinder piston, crank shaft and joint mechanism.

Fig. 3 is a detail of a piston rod including one toggle joint member.

Fig. 4 is a detail of a piston rod including the other toggle joint member.

Fig. 5 is a detail of the joint closure.

Fig. 6 is a side view of the detail shown in Fig. 5.

Fig. 7 is a side view of the detail shown in Fig. 4.

Like numerals of reference indicate corresponding parts in each figure.

Referring to the drawings, the numerals 1 and 2 indicate the pistons here shown as operating in the cylinders 3 and 4 set at a 90° angle in relation to one another.

The pistons 1 and 2 have the inner ball sockets 5 and 6 which receive the balls 7 and 8 and therewith form ball and socket joints, said balls 7 and 8 being the finished integral ends of the piston rods 9 and 10.

The piston rods have the threaded outer ends 11 and 12 beyond the shoulders 13 and 14, said rods being formed with flat sides 15 and 16 at and near said shoulders.

The piston rod 9 is screw threaded at its outer end into the toggle member 17, which is formed of the shoulder 18, bearing the parallel crescent-shaped arms 19, one at each side and forming the parallel toggle crescent bearings 20, the horns 21 of the crescent, being inwardly drawn, making a wide split 22 in the bearing or opening thereinto.

The piston rod 10 is screw threaded into the toggle member 23 and particularly into the shoulder 24 forming part with the journal member 25, in the periphery of which the crescent-shaped bearing surfaces 26 and 27 are formed at each side to correspond to and turn in the crescent bearings 20. Within the member 23, the half section 28 of the shaft bearing is formed and the straight slot 29 leads to said half section 28, said slot 29 terminating in the ledges 30.

The block 31 is formed to close in the slot 29 and terminates in the edge faces 32 fitting on to the ledges 30, the inner surface of said block forming the other half section 33 to complete the shaft bearing with the half section 28.

The outer surface of the block 31 is formed to correspond with and continue annularly the outer surface of the member 23 and has the bearing surfaces 34 and 35 completing an annular bearing together with the crescent-shaped bearing surfaces 26 and 27, the central rib 36 of said block 31 corresponding with the central rib 37 extending from the shoulder 24 and continuing the same and turning between the bearings 20.

The washers 38 and 39 are introduced between the shoulders 13 and 14 respectively and the shoulders 18 and 24 and the ends thereof turned against the flat sides of the shoulders 18 and 24 and the flat sides 15 and 16 of the piston rods.

It will now be seen that by the removal of the block an aperture is made through which the crank 40 is inserted and following this the block 31 is replaced and the positions of the rods 9 and 10 reversed or of the shoulders into which said rods are screwed, as the rods are of course attached to the pistons, in ordinary practice, then secured to the toggle members.

In the operating positions of the rods, the customary practice is to set them at an angle of 90° and thus the block 31 is turning within the crescent-shaped bearings 20, consequently the crank is securely held in its bearing and by no possible chance can it be removed therefrom except by unscrewing a piston rod and reversing its position, so as to bring the block in its slot to register with the permanent split denoted by the space between the horns of the crescent.

It may be possible to use this construction in some cases without a block to close the inner toggle member, and it may be considerably changed in its details for various uses without departing from the spirit of the invention, so long as such changes are within the scope of the claims for novelty following this description.

What I claim is:

1. In a device of the class described, a pivotal connecting member, a crank journaled therein, a block closing in said crank and completing the journal bearing, an outer pivotal member forming a bearing for the aforesaid member and closing in said block, and rods secured to said members.

2. In a device of the class described, a pair of pistons, a pair of rods secured thereto, an outer toggle member at the end of one of said rods and forming a journal bearing having a permanent opening thereinto, an inner toggle member journaled in said outer toggle member and having a crank slot leading thereinto, a bearing block completing the crank bearing and forming a closure for said slot and a crank journaled in said inner toggle.

3. In a device of the class described, a pair of pistons, a pair of rods secured thereto, an outer toggle forming parallel and part circular side bearings having a comparatively wide opening leading thereinto and at the end of one of said rods, an inner toggle secured to the other rod and having side bearing surfaces journaled in said side bearings and a wide slot leading thereinto, a block closing said slot and completing a crank bearing, and a crank journaled in said inner toggle.

4. In a device of the class described, a pair of pistons, a pair of rods secured thereto, an outer toggle of substantially crescent shape and rigid with one of said rods, an inner toggle secured to the other piston rod and forming a half section of the crank bearing and journaled in said outer toggle, a bearing block completing the crank bearing and closing the opening to said inner toggle and turning within said outer toggle in the operating position, and a crank.

5. In a device of the class described, a pair of pistons, a pair of rods secured thereto, an outer toggle having parallel bearing members of substantially crescent shape and forming a comparatively wide opening between the horns of the crescent, an inner toggle and a removable block completing a journal bearing for a crank and together journaled in said outer toggle and entered prior to the insertion of the block through said wide opening, and a crank.

6. In a device of the class described, a pair of pistons, a pair of rods secured to said pistons, an outer toggle at the end of one of said piston rods and having parallel part circular bearing members therefrom forming an opening for the insertion of an inner toggle, an inner toggle having a shoulder screw threaded to the other piston rod and a centrally slotted ring portion and a block closing said slot and completing a crank bearing and side bearing surfaces journaled in the said outer toggle, and a crank.

Signed at the city of Montreal, Quebec, Canada, this 27" day of February, 1919.

ERNEST DUCHESNE.